US008252888B2

(12) United States Patent
Van Endert

(10) Patent No.: US 8,252,888 B2
(45) Date of Patent: Aug. 28, 2012

(54) PROCESS FOR CONTINUOUS PREPARATION OF HIGH MOLECULAR WEIGHT POLYESTERS BY ESTERIFICATION OF DICARBOXYLIC ACIDS AND/OR TRANSESTERIFICATION OF DICARBOXYLIC ACIDS WITH DIOLS AND/OR MIXTURES THEREOF AND AN APPARATUS THEREFOR

(75) Inventor: Eike Schulz Van Endert, Berlin (DE)

(73) Assignee: Uhde Inventa-Fischer GmbH, Berlin (DE)

(*) Notice: Subject to any disclaimer, the term of this patent is extended or adjusted under 35 U.S.C. 154(b) by 0 days.

(21) Appl. No.: 13/355,938

(22) Filed: Jan. 23, 2012

(65) Prior Publication Data

US 2012/0136132 A1     May 31, 2012

Related U.S. Application Data

(62) Division of application No. 12/302,254, filed on Dec. 16, 2008, now Pat. No. 8,110,149.

(30) Foreign Application Priority Data

Jun. 2, 2006   (DE) .................. 10 2006 025 942

(51) Int. Cl.
| | |
|---|---|
| C08G 63/00 | (2006.01) |
| C08G 63/02 | (2006.01) |
| B01J 19/00 | (2006.01) |
| B01J 19/18 | (2006.01) |
| B01J 8/00 | (2006.01) |

(52) U.S. Cl. ........ 528/276; 528/271; 528/272; 528/274; 528/275; 528/277; 528/279; 528/283; 528/285; 528/308; 528/308.1; 528/308.3; 528/308.6; 528/308.8; 422/129; 422/131; 422/134; 422/135; 422/187; 422/198; 422/224; 526/65

(58) Field of Classification Search .................. 528/271, 528/272, 274, 275, 277, 279, 283, 286, 308, 528/308.1, 308.3, 308.6, 308.8; 422/129, 422/131, 134, 135, 138, 187, 198; 526/65
See application file for complete search history.

(56) References Cited

U.S. PATENT DOCUMENTS

| | | | |
|---|---|---|---|
| 3,563,710 | A | 2/1971 | Dew et al. |
| 5,055,273 | A | 10/1991 | Wilhelm et al. |

(Continued)

FOREIGN PATENT DOCUMENTS

| | | |
|---|---|---|
| DE | 44 47 422 C2 | 10/1996 |
| DE | 10000527 A1 | 7/2001 |
| DE | 10041595 A1 | 9/2001 |
| DE | 69714231 T2 | 3/2003 |
| DE | 10155419 A1 | 5/2003 |
| DE | 102004019810 A1 | 3/2005 |
| EP | 0320586 A1 | 10/1988 |
| EP | 1253163 A1 | 4/2002 |
| WO | 03/042278 A | 5/2003 |

*Primary Examiner* — Walter D Griffin
*Assistant Examiner* — Natasha Young
(74) *Attorney, Agent, or Firm* — Barnes & Thornburg LLP

(57) ABSTRACT

The present invention relates to a method for the continuous production of high-molecular polyesters by esterification of dicarboxylic acids and/or transesterification of dicarboxylic acid esters with diols and/or mixtures thereof in the presence of catalysts with formation of a prepolymer in a tower reactor and polycondensation thereof to form a high-molecular polyester in a polycondensation reactor, a prepolymer with >40 to 70 repeat units (DP) being produced in the tower reactor and this prepolymer being polycondensed in only one further reactor to form a polyester with >150 to 205 DP.

19 Claims, 7 Drawing Sheets

U.S. PATENT DOCUMENTS

Figure 2:
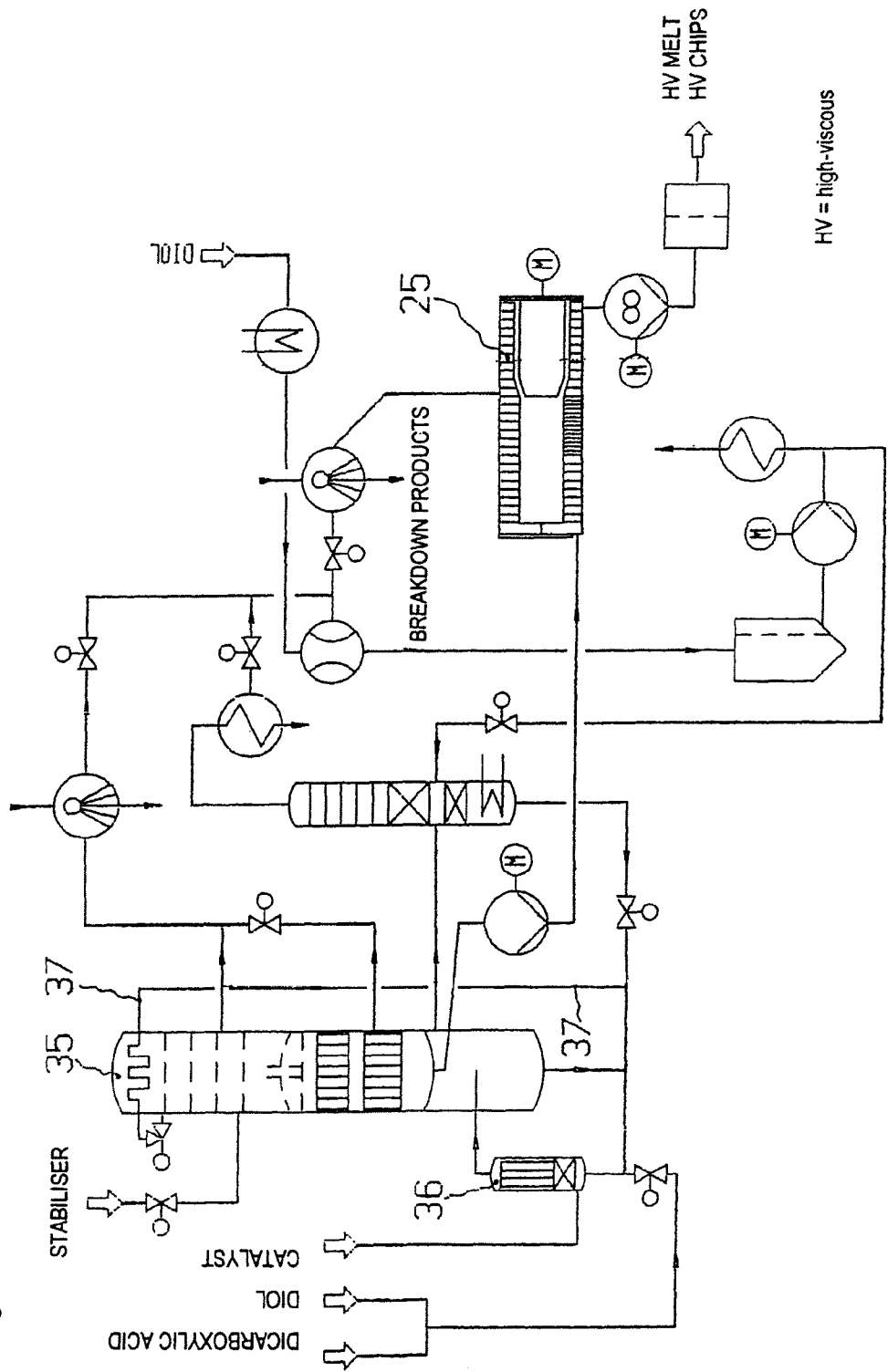

| | | |
|---|---|---|
| 5,064,935 A | 11/1991 | Jackson et al. |
| 5,410,984 A | 5/1995 | Pikus |
| 5,849,849 A | 12/1998 | Bhatia |
| 6,096,838 A | 8/2000 | Nakamoto et al. |
| 6,359,106 B1 | 3/2002 | Nakamoto et al. |
| 7,300,999 B2 | 11/2007 | Deiss et al. |
| 7,964,152 B2 | 6/2011 | Van Endert |
| 2002/0188091 A1 | 12/2002 | Hucks |
| 2003/0139543 A1 | 7/2003 | Wilhelm et al. |
| 2005/0163679 A1 | 7/2005 | Van Endert et al. |
| 2005/0239995 A1 | 10/2005 | Kirchoff |
| 2009/0234093 A1 | 9/2009 | Van Endert |

Figure 1

1. Correlation intr. viscosity/molar mass

$$\eta\text{ intr.} = 7.5 \cdot 10^{-4} \cdot M_n^{0.68} \qquad \text{(Hauenstein, Moore)}$$

2. Correlation molar mass/ no. of chain element-repeat units (DP)

$$M_n = DP \cdot M_K \qquad M_K = \text{molar mass of the chain element}$$

3. Correlation dyn. viscosity/intr. viscosity

$$\eta_0 = K \cdot \eta\text{ intr.}^{5.02} \quad \text{wherein} \quad K = -189.2 + 0.0433 \cdot e^{(17.55 - 0.02261\,\vartheta)}$$

$$\vartheta = \text{polymer temperature}$$

Hence the following correlation between melt viscosity in [Pas] and DP is produced: $\eta_0 = (-189.2 + 0.0433 \cdot \exp[17.55 - 0.02261 \cdot \vartheta]) \cdot (7.5 \cdot 10^{-4} [DP \cdot M_K]^{0.68})^{5.02}$

Example:
- $\vartheta$ = 280 °C
- $M_K$ = 192.168 Kmol/kg (Polyester)
- DP = 153.6
- $M_n$ = 29517 Kmol/kg $\eta_0 = 3038 \cdot 0.3731 = 1133$ Pas

| $M_n$ | DP | $\eta_0$ [Pas] | | | | $\eta$ intr. ASTM |
|---|---|---|---|---|---|---|
| | | 270 °C | 280 °C | 290 °C | 300 °C | |
| 37000 | 193.5 | 3113 | 2452 | 1925 | 1504 | 0.958 |
| 35000 | 182.1 | 2073 | 2023 | 1588 | 1241 | 0.923 |
| 30000 | 156.1 | 1521 | 1198 | 941 | 735 | 0.831 |
| 26000 | 135.3 | 933 | 735 | 577 | 451 | 0.754 |
| 20000 | 104.1 | 381 | 301 | 236 | 184 | 0.631 |
| 18000 | 93.7 | 266 | 233 | 165 | 129 | 0.587 |

PROCESS FOR CONTINUOUS PREPARATION OF HIGH MOLECULAR WEIGHT POLYESTERS BY ESTERIFICATION OF DICARBOXYLIC ACIDS AND/OR TRANSESTERIFICATION OF DICARBOXYLIC ACIDS WITH DIOLS AND/OR MIXTURES THEREOF AND AN APPARATUS THEREFOR

CROSS REFERENCE TO RELATED APPLICATIONS

This application is a divisional and claims the priority benefit of U.S. patent application Ser. No. 12/302,254, now U.S. Pat. No. 8,110,149, filed Dec. 16, 2008, which is a national stage application of PCT/EP2007/004835, filed May 31, 2007, which claims the priority benefit of Germany application number 10 2006 025 942.4, filed Jun. 2, 2006, the disclosures of which are incorporated herein by reference.

The present invention relates to a method for the continuous production of high-molecular polyesters by esterification of dicarboxylic acids and/or transesterification of dicarboxylic acids with diols and/or mixtures thereof in the presence of catalysts according to the characterising features of patent claim 1. With respect to the polyesters, the invention thereby encompasses e.g. polyethyleneterephthalate (PET), polybutyleneterephthalate (PBT), polynaphthaleneterephthalate (PEN), polytrimethyleneterephthalate (PTT) and/or polyesters of other dicarboxylic acids and diols including the copolymers thereof. The invention relates furthermore to a device for the continuous production of high-molecular polyesters comprising at least one tower reactor and at least one end reactor having the features of patent claim 18.

A generic method and a device for the production of the corresponding polyesters are known from WO 03/042278 A1.

In the case of this already known method, a low thermally loaded prepolymer is produced, in a first step, by means of a tower reactor, this precondensate having 10 to at most 40 repeat units (DP). The postcondensation is implemented, in the previously known method, in liquid phase, i.e. in the melt phase, special reactors being used as described e.g. in DE 44 47 422 C2. This reactor, which is also termed end reactor, concerns a horizontal agitated vessel which is equipped with an agitator, the extremely high surface formation rate of which leads to rapid diffusion of the liquid reaction component mostly of glycols and volatile by-products. When using reactors of this type for postcondensation, with the method of the state of the art, a polymer which has 80 to at most 150 repeat units can then be produced.

The polymers obtained with the previously known method are intended in particular to be suitable for the direct production of bottle granulate and preforms and also industrial yarns including tire cord made of high-viscous melt phases, for polycondensation without interposition of a solid phase postcondensation. However, it has now been shown that the polymers produced with the previously known method, with respect to the molecular weight expressed in repeat units (DP), are still unsatisfactory in as much as it is not possible in all cases to use the produced polymer directly for the production of bottle granulate and preforms without interposition of a separate and complex postcondensation.

It is therefore the object of the present invention, starting from the method described in WO 03/042278 A1 to propose a development such that the polyesters produced with the method have a significantly higher molecular weight expressed in ester repeat units (DP) so that high-viscous, long-chain polyesters are produced in a manner in which the melt already has the required properties which permit direct further processing to form bottles or industrial yarns. The polyesters to be produced must also be configured for this purpose such that the by-products are restricted to a minimum. The by-products, such as e.g. acetaldehyde (AA), are formed regularly at a speed increasing with temperature as a function of the dwell time. The method to be developed must therefore ensure at the same time that the melt can be discharged from the reactor within a few seconds without delay after gas evolution and the concentration of residual gases and the reformation is reduced to values between 1 and 10 ppm.

It is a further object of the present invention to indicate a corresponding device for this purpose.

According to the method according to the invention, it is hence proposed that a prepolymer is produced in the tower reactor which already has more than 40 to at most 70 repeat units (DP), preferably 45 to 65, particularly preferred 50 to 60. This prepolymer with the molecular weight as defined above expressed in repeat units (DP) is then polycondensed in an end reactor to form a polyester with >150 to 205 DP. The correlation between repeat units DP, molar mass and viscosity is shown by way of example in FIG. 1.

The prepolymer is distinguished in that it is produced within a total reaction time of 3 hours, preferably at most 2.5 hours, by means of a surface-active configuration of the reaction chambers present in the tower reactor at temperatures of 5 to 20° C. above the melting point of the precondensate and a continuous pressure reduction already in the esterification during the transition to the precondensate. Advantageously, in order to achieve the aim of the method, the film region of the tower reactor is improved in such a manner that the falling-film pipes receive a filling comprising structured packing, filling materials, expanded metal and/or conducting spirals. These serve for the purpose of increasing the surface and increasing the dwell time of the polymer slightly. This permits an even gentler treatment with respect to temperature stress which can be lowered by 5 to 10° C. in comparison with the method of the state of the art and leads at the same time to higher oligomer chain lengths. The pressure reduction is effected specifically such that the chain lengthening of the oligomer is adjusted such that it is always located below the equilibrium pressure for the vapour phase and in fact between 400 and 5 mbar. As a result, optimum reaction progress is achieved without premature evaporation of low-molecular, mainly dimers. Advantages with respect to raw material consumption and operating safety are hence obvious. The reduction in the formation by-products, such as e.g. diethylene glycol in this process phase, is likewise advantageous, in particular the formation of ester groups which lead to acetaldehyde (AA) formation in the course of the polycondensation. The prepolymer produced with the above-described method is distinguished by the following features:

ester repeat units >40 to 70,
DEG content 0.6 to 0.9% by weight,
COOH end groups 20 to 40 meq/kg,
OH end groups 60 to 120 meq/kg,
vinyl ester groups 2 to 3 meq/kg,
low-boiling point fraction <10 ppm.

In particular for industrial yarns in the tire industry, because of possible hydrolysis and consequently caused strength loss in the carcass, low $CO_2H$ groups below 15 meq/kg and a low DEG content below 1% by weight are important. With higher values in the prepolymer than are achieved according to the method according to the invention, such finished products cannot be achieved with conventional methods. The same applies also to bottle production. Also carboxyl end group contents of approx. 20 meq/kg and low DEG contents are advantageous there in order to improve the stability and hot-fill properties of the bottle. In addition, there is a required lower AA content below 1 ppm, in particular for use with still waters and baby food. For such special applications, normally so-called AA scavengers are added to the polymer before the extrusion machines, which are undesired as a cost factor and for recycling reasons. In a simple adiabatic diffusion/temperature-control process which is subsequent to the granulate production, likewise AA values of below 1 ppm can be achieved with the method according to the invention without such scavengers. The temperature control at 150 to 180° C. is effected without further postcondensation with a gas flow, by diffusion of the low AA components from the granulate using the residual inner heat content and possibly low heat supply to the newly produced granulate. Such methods have been used successfully already for a long time for drying and degassing polyesters. The crystallisation degree remains below 45%. As explained above, it is therefore essential that the precondensate already has the polymerisation degree, mentioned in claim 1, of >40 to at most 70 DP since otherwise no end products can be achieved after the polycondensation which have the desired properties.

As an essential further element, there must be mentioned in the method according to the invention the postcondensation in the melt phase. The postcondensation is implemented according to the present invention with an end reactor, it being essential that a prepolymer, as described above, is supplied to the end reactor. Only if a prepolymer with the above-described properties is used is it possible to fulfil the high requirements, also mentioned above, for the end products.

The end reactor used in the method according to the invention is now distinguished in that the horizontally rotating rotor has at least one partially heated portion. It has thereby proved to be favourable if a rotor is used which is constructed such that it has a separate heated portion which is disposed on the outlet side and a separate unheated portion. The heated portion is thereby designed from the dimensioning thereof such that it essentially covers the high-viscous region and the unheated portion the low-viscous region. Due to this configuration of the method according to the invention, it is now achieved that the precondensate supplied to the end reactor can be condensed to form a polycondensate with >150 to at most 205 DP, preferably >150 to 200 DP, particularly preferred >150 to 180 DP. It is further preferred if the transition from the perforated to the unperforated basket frame is configured as a long cone since an operation which is almost without a sump is made possible by the displacement effect thereof, 70-90% of the polymer being displaced for surface formation onto the film-forming rings and the heated basket, as a result of which the end products obtain the desired properties.

A crucial advantage of the method according to the invention now resides in the fact that if the above-described method parameters are maintained with respect to the prepolymer and the conditions in the polycondensation, a polyester is obtained which can then be directly further processed. It has been shown then that polyester produced with the method according to the invention has DEG contents below 1% by weight and that the $CO_2H$ end group content is below 15 meq/kg. It is favourable furthermore in the case of the method according to the invention if the polycondensates produced with the above-described method are kept in the discharge region in the end reactor in communication at a temperature between 270 and 280° C. with a gas chamber at reduced pressure. The melt can then be discharged from the polycondensation via a melt line and be granulated or spun directly. In the case of the method according to the invention, it is also possible that the granulate is produced by hot cutting and is further treated with a crystallisation using the inherent heat of the granulate and a simultaneous or subsequent degassing with a drying gas a temperature between 150 and at most 180° C.

There are suitable as educts in the method according to the invention in the case of diols, in particular butane diol, ethylene glycol, propane diol and cyclohexane dimethanol and, in the case of the carboxylic acids, terephthalic acid, naphthalenic acid, adipinic acid and isophthalic acid. In the case of the dicarboxylic esters, there should be mentioned as examples dimethylterephthalate (DMT) and naphthalenic acid dicarbonate. Suitable catalysts for the method are antimony, germanium, tin and/or titanium metals or organic compounds hereof which can be used also in the form of a porous carrier substance or as nanoparticles.

The invention relates furthermore to a device for the continuous production of high-molecular polyester by esterification of dicarboxylic acids and/or transesterification of dicarboxylic acids with diols and/or mixtures thereof in the presence of catalysts comprising at least one tower reactor for the production of a prepolymer and a specially configured end reactor having the features of patent claim 18.

According to the invention, it is hence provided that the cylindrical rotor itself has an at least partially heated portion. Due to the configuration of an at least partially heated portion of the cylindrical rotor, it is achieved that also high-viscous polymer products can be processed without so-called "dead spots" arising, which could lead to ultraviscous and high crystalline deposits which would reduce the quality of the end product.

The heating or cooling of the rotor can thereby be configured such that the rotor is completely heated or else that the rotor is divided into two portions, and in fact an unheated and a heated portion which is disposed at the outlet side. The heated portion is thereby designed such that it essentially covers the high-viscous region and the unheated portion the low-viscous region. According to the polymer, one to two thirds of the horizontally disposed rotor can therefore be formed by the heated portion which is disposed at the outlet side.

In the case where a continuously heated/cooled rotor is provided, it is favourable if a corresponding temperature gradient, starting from a low temperature at the inlet, i.e. in the low-viscous region, up to a higher temperature in the high-viscous region at the outlet, is produced by suitable measures.

Preferably, the reactor device is however constructed such that it has an unheated portion and an outlet-side heated portion. The heated portion is located in the high-viscous region and can comprise one to two thirds of the entire horizontal reactor with respect to the horizontal extension.

In the case of the reactor according to the invention, the unheated portion is thereby formed preferably by a perforated basket frame and the heated portion by a closed frame. The closed frame provided in the high-viscous region is provided preferably in addition with heating which can be configured as a double jacket for heat transfer oils or electric radiation heating. The transition from the perforated to the unperforated basket frame is configured as a long cone which characterises the transition from the medium-viscous sump to the high-viscous almost sump-free operation.

The heating/cooling of the basket frame when choosing a liquid heat carrier is effected through the drive shaft by means of a leadthrough which is surrounded with insulation within the same. This avoids undesired heat transmission to bearings and seals of the agitator. The drive itself is configured as a slip-on gear mechanism with a torque converter bearing.

The ratio of perforated frame diameter to the reaction chamber diameter is according to the invention between 0.5 and 0.6 and the ratio of the closed frame to the reaction chamber 0.65 to 0.75. Furthermore, it has proved to be advantageous if the L/D ratio (length ratio L to diameter ratio D) of the reaction chamber is 1 to 3.5, preferably 1.5 to 3.0, particularly preferred 2.5 to 3.

A further characteristic of the present invention resides in the fact that the annular film-forming elements are configured as a tubular crown, a net-like metallic pipe structure with a different geometry being clamped between the tubular crown and the rotor surface. It has been shown that, contrary to previous experience, the construction of the surface-forming rings with a high-viscous polymer comprising rectangular profiles and spokes with round or polygonal (e.g. hexagonal) openings represents a solution which is not preferred. It is shown rather that round cross-sections (pipes) for the support construction assist the reception of polymer and the formation of striations and films, the pipe construction making available triangular and/or lozenge-shaped openings in which the drawing for the film formation takes place. The openings can hereby be disposed on tubular involutes which produce the connection to the basket frame and ensure that an enlargement of the film surface is always effected due to the rotational movement of the basket. This arrangement also has the advantage that a gentle shearing (drawing cut) takes place at the strippers, as a result of which the energy input is significantly reduced.

Furthermore it is advantageous that, in contrast to rectangular profiles on the pipe rings, no stationary horizontal surfaces are formed on which the polymer can persist for a longer time, as a result of which it would lead to impairment in quality. On round cross-sections, the polymer surrounds the cross-section with the formation of films such that gravitation on the mass comes into effect. Consequently, the result is continuous material exchange and constant formation of particularly thin and stable product films which lead to rapid evaporation of mobile reactands or solvents.

The tubular film-forming elements are thereby disposed on the rotor perpendicular to the container axis.

As already known in the state of the art, a stripper is provided between each pair of tubular film-forming elements. However, it is preferred in the case of the reactor device according to the invention if, in the region of the unheated portion, i.e. in the region of the perforated basket frame, strippers (stators) are provided and, in the region of the heated portion, i.e. in the region of the closed frame, so-called conveyer strippers and counter-strippers are provided. The purpose of the strippers/conveyer strippers and counter-strippers resides in the fact that the polymer mass withdrawn from the sump through the tubular crown is delimited to the same and it is avoided at the same time that closed polymer bridges are produced in the intermediate space. Therefore, an arrangement of the strippers tangentially to the lower edge of the basket is preferred. A further purpose of the strippers/conveyer strippers and counter-strippers resides in the fact that the beads which form on the closed frame are pushed through the tubular crown and polymer beads which flow from the smooth basket frame wall are exchanged for thin layers, the mass being collected in the sump.

The conveyer strippers disposed between each pair of film-forming elements and the strippers disposed on the opposite side of the frame ensure at the same time that the beads and polymer mass which accumulate at the intermediate space between two tubular crowns are pushed through the next disc in the flow direction and thereby effect self-cleaning of the pipe rings at the connection points to the frame and simultaneously reloading of the same.

The strippers are configured in the form of triangular cross-sections with a different positioning of one side relative to the horizontal. As a result, the conveyer effect is produced.

A further characteristic of the reactor device according to the invention resides in the fact that the heated basket frame is guided at a small spacing up to the reactor end cover. At the periphery of the basket frame, a resilient circumferential blade stripper element is disposed which avoids contamination of the end cover. The intermediate space can thereby be purged with an inert gas.

In the region at the discharge, a crescent moon-shaped displacer is preferably disposed in addition, which displacer ensures a dead space-free transition to the pump suction opening and is positioned at a specific angle following the polymer sump. For optimum final degassing of the polymer, one or more annular film-forming elements are provided in front of the displacer and, in conjunction with recirculating strippers, likewise ensure a supply of polymer to the pump.

In the case of the reactor device according to the invention, it must be emphasised furthermore that it is favourable if the polymer outlet connection piece has a rectangular configuration, the longer sides being disposed at right angles to the container axis so that product supplied by the strippers effects optimum filling of the discharge gear pump. The polymer outlet connection piece is preferably a rectangular block flange which forms a connection to the heating jacket thereof in the container wall, which is disposed, not in the normal manner perpendicular to the central axis of the container, but displaced parallel in the direction of rotation of the basket. As a result, the constant, complete filling of the gear pump is ensured in addition.

In the case of the reactor device according to the invention, also the arrangement of the gas vacuum pipe (vapour connection piece) at a longitudinal position of the reactor in the upper region is furthermore advantageous. The arrangement of the pipe just before the high-viscous zone has been shown to be particularly favourable, e.g. after approx. 60% of the reactor length. In order to avoid turbulence of the gas flow at the transition point to the pipe, a transition reduction in the cross-section ratio 2 to 3:1 is preferred, an inclination from the upper central line of the container of 10° to 30° in the direction of rotation of the basket being particularly favourable. Also a further vapour pipe can be provided in the first third of the housing in order to remove the main mass of the solvent or reaction gas advantageously before the high-viscous part of the reactor.

The device according to the invention for the polycondensation of polyesters is also distinguished furthermore in the modification to the device as described in WO 03/042278 A1 in that a tower reactor is proposed, the falling-film pipes of which have a filling comprising structured packing, filling materials, expanded metal and/or conducting spirals.

Figure 3:
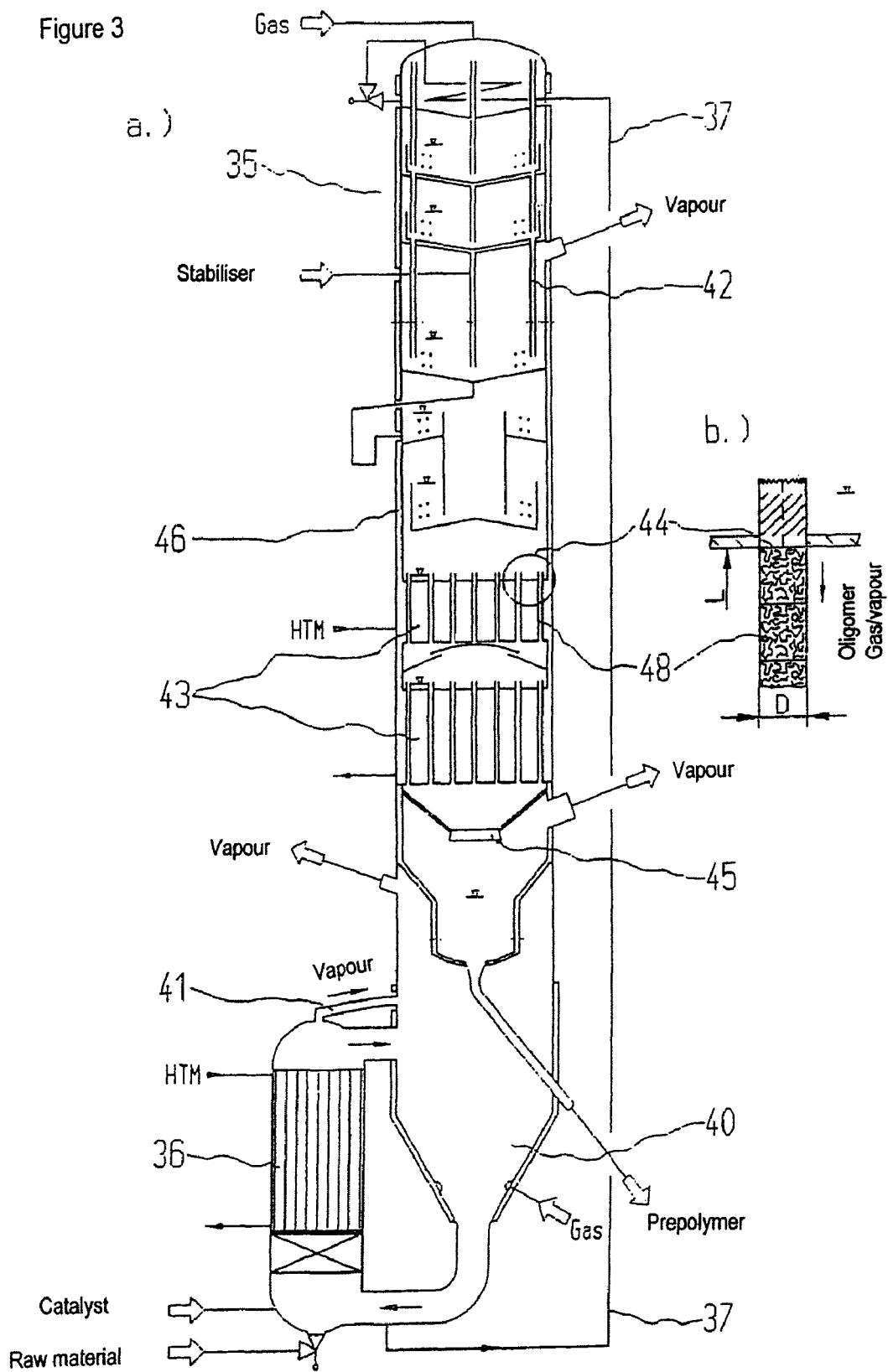
Figure 4:
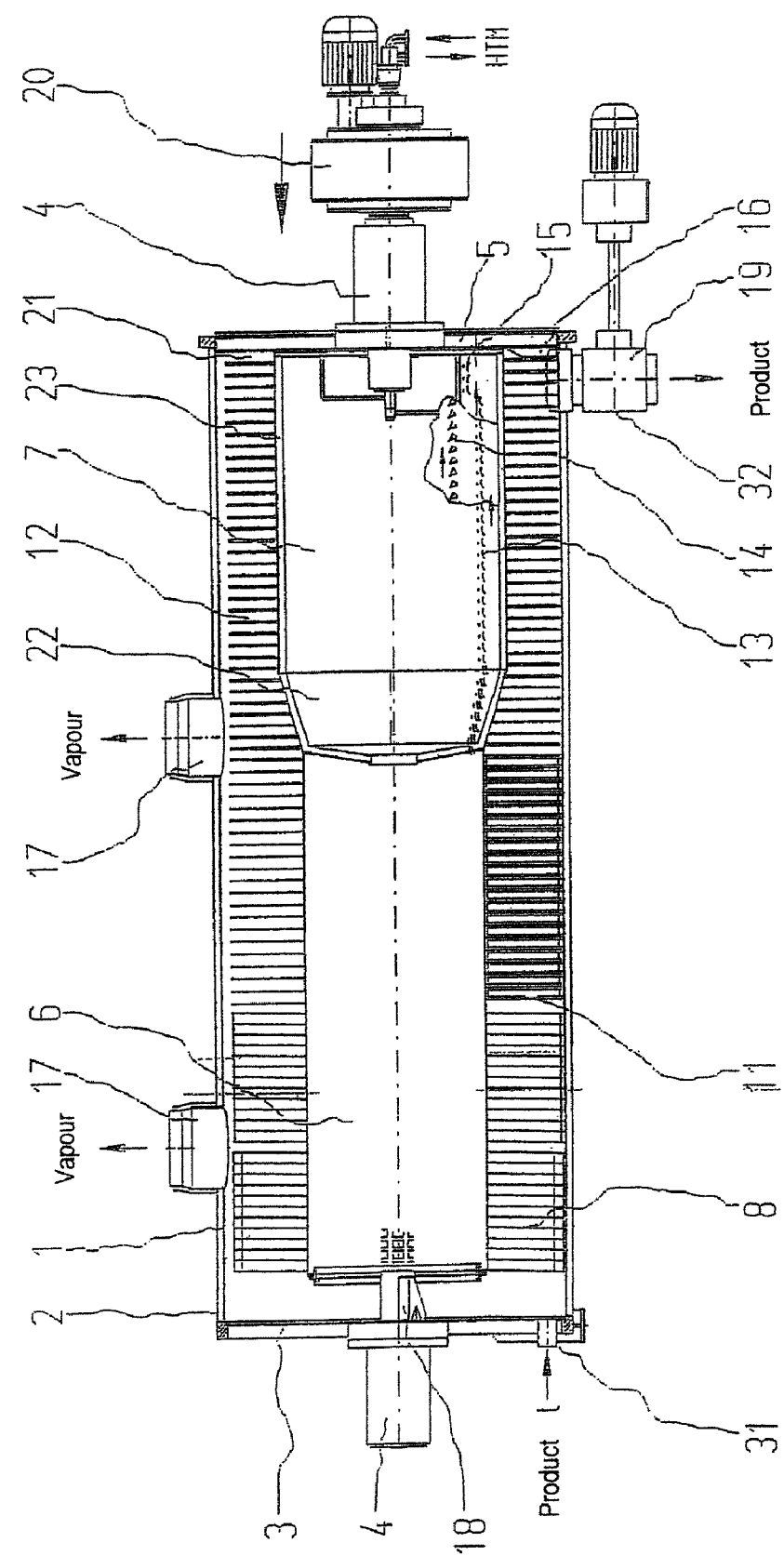
Figure 5:
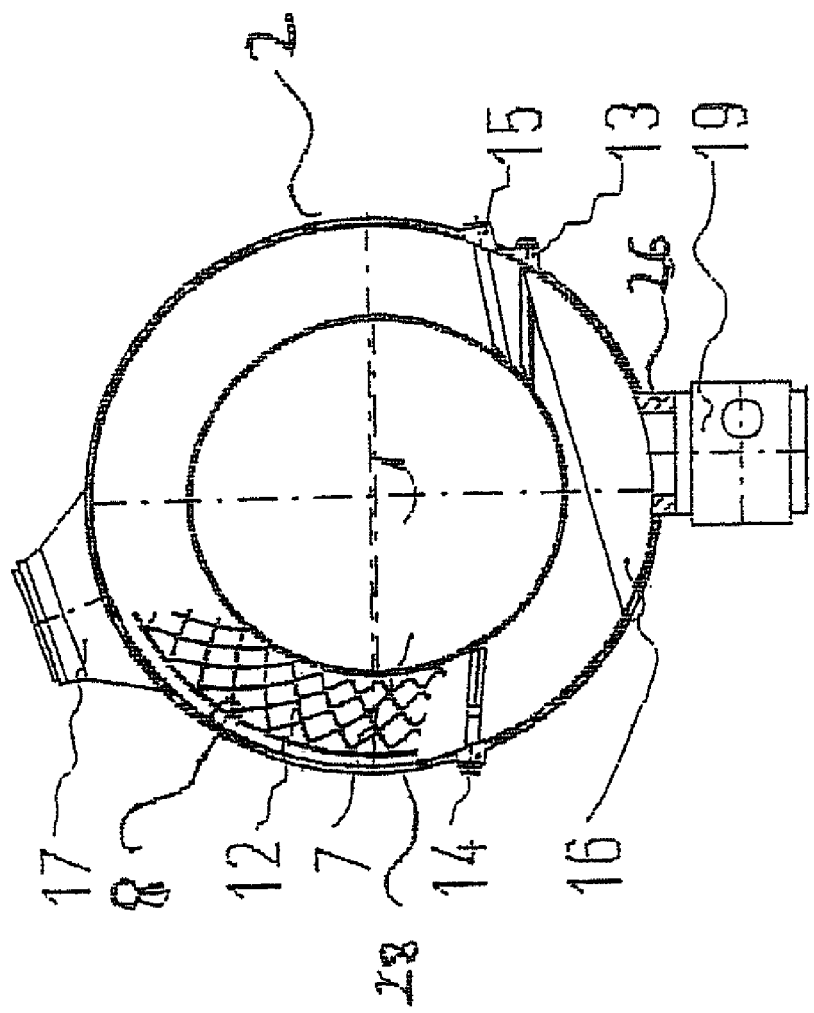
Figure 6:
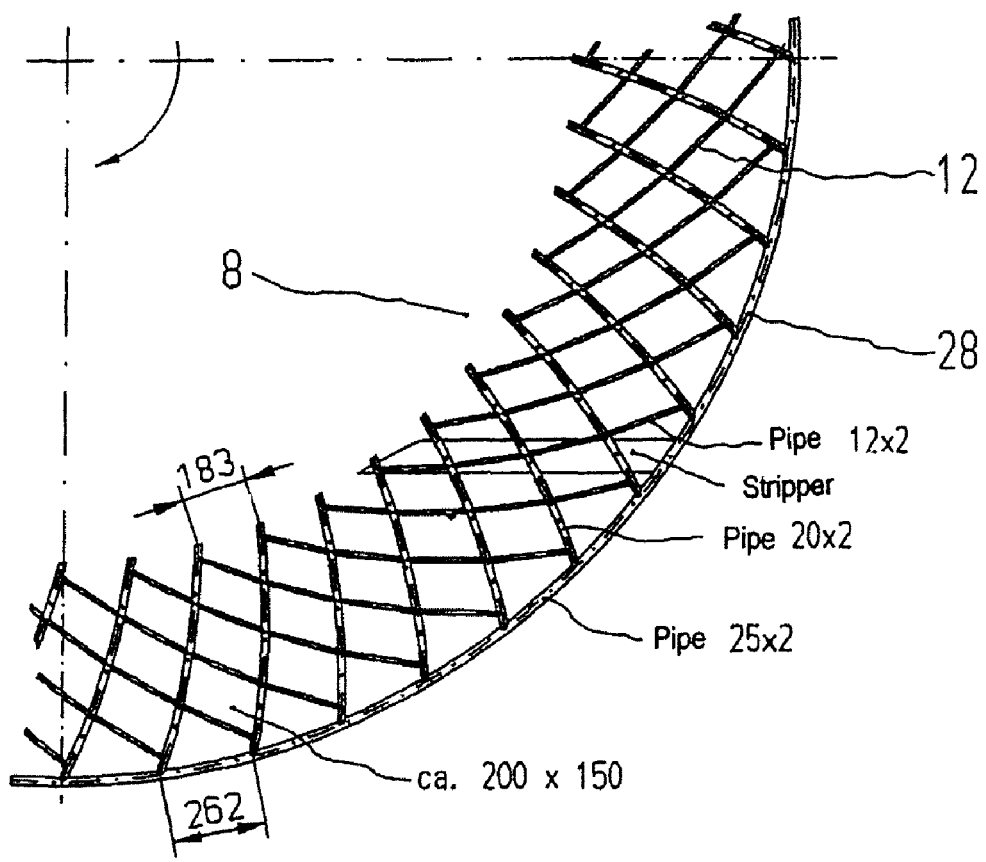
Figure 7:
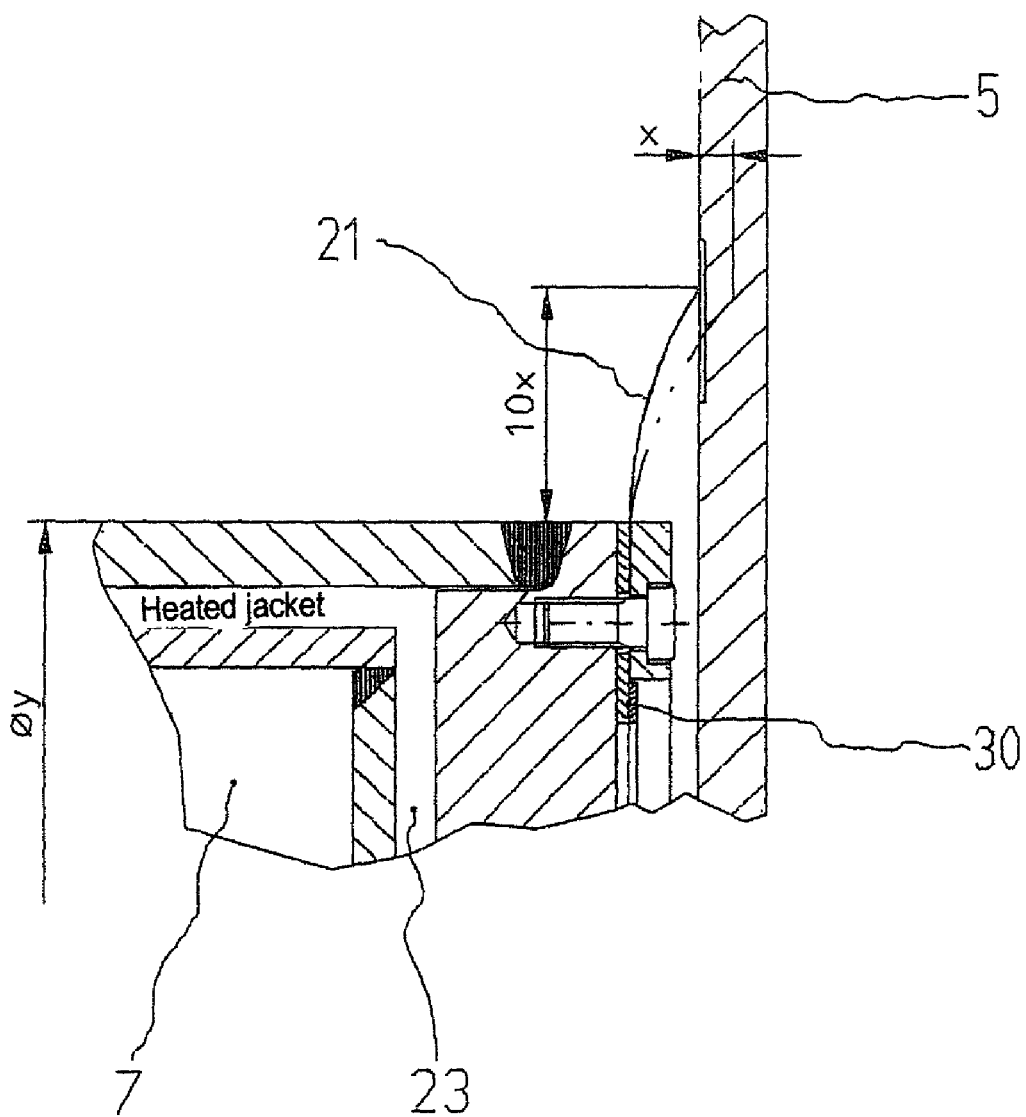

The invention is explained subsequently in more detail with reference to FIGS. 1 to 7 without however restricting the subject of the present invention hereto. There are hereby shown:

FIG. 1 the correlation between repeat units, molar mass and viscosity,

FIG. 2 a flow chart of the course of the method according to the invention,

FIG. 3 a section through the tower reactor,

FIG. 4 a longitudinal section through the end reactor,

FIG. 5 a cross-section of the end reactor,

FIG. 6 the configuration of the annular film-forming elements of the end reactor, FIG. 7 a partial view of the end cover construction.

FIG. 2 now shows a schematic flow chart of the method according to the invention for the production of polyesters. The course of the method thereby corresponds essentially to that described already in the state of the art in WO 03/042278 A1 already mentioned initially. It is essential with the method according to the invention that a modification has been undertaken in the tower reactor 35 such that the falling-film zone has been configured in a specific defined manner. The precise configuration of the falling-film zone and the course of the method, as effected in the tower reactor, is described in more detail in the subsequent FIG. 3. The end reactor 25 should be mentioned as second essential element in the case of the method according to the invention. The end reactor 25 thereby differs from the devices known in the state of the art, in particular from the device as described in DE 44 47 422 C2, such that the end reactor has a rotating rotor which has an at least partially heated portion. Consequently, in conjunction with the specific configuration as described in more detail in FIGS. 4 to 7, an essentially sump-free operation is ensured so that ultimately polycondensates can be produced, the molecular weight of which is >150 DP up to at most 205 DP. With respect to the conditions which are maintained in the end reactor, reference is made to the description of the subsequent FIGS. 4 to 7.

FIG. 3 shows the schematic construction of the tower reactor 35. The course of the method in the tower reactor and the tower reactor itself is described subsequently in more detail. A slurry of the dicarboxylic acid with the diol or the molten dicarboxylic acid ester and the diol are injected into the reaction mass under pressure in the lower region of a heat exchanger, which is suspended on the tower reactor 35, with a preceding reaction mixture 36, the result being, due to suitable configuration of the injection connection piece, optimum mixing with the boiling reaction product located in the lower part. Here, also a catalyst which is advantageous for some polyester reactions can be fed in. The heat exchanger ensures heating of the mixture to the reaction boiling temperature. The boiling reaction mixture passes via a short connection pipe which discharges tangentially into a hydrocyclone 40 for further reaction. For rapid reaction gas discharge from the reaction mass, the main part of these gases is conducted via a separate pipe, a vapour riser 41, out of the heat exchanger into the gas chamber of the cyclone.

Further degassing with continuation of the reaction takes place in the hydrocyclone 40. The reacted product passes via a short connection pipe at the foot of the cyclone back into the heat exchanger 36 so that a natural circulation is produced. The entire reaction gas is discharged out of the vapour chamber of the hydrocyclone 40 above the reaction mass.

In the case of particularly sensitive products, such as e.g. in the production of PBT, there is produced by cyclisation of butane diol the undesired tetrahydrofuran (THF). The formation is reinforced by the presence of water which is produced for example during the esterification.

A preheated, unsaturated carrier gas or superheated process vapours can in this case be introduced advantageously in the lower region of the cyclone, as a result of which the removal of, in particular water, methanol, acetaldehyde or tetrahydrofuran out of the reaction mass is accelerated.

A partial flow of the degassed reaction product is removed from the lower connection pipe and pumped into a heated pressure pipe 37 by means of a pressure-building volume conveyer. The pressure pipe 37 is equipped, at the pump outlet, with a metering pipe for diol which is mixed intimately with the reaction mass via static mixing elements. According to the product, a pressure of up to 10 bar can be adjusted here via a pressure retaining valve. Alternatively, the mixing and the pressure can also be produced by a special mixing pump.

By introducing the diol under pressure, a spontaneous conversion with the carboxyl or methoxy groups is initiated, which takes place in the time range of 1 to 5 minutes and, after reduction to atmospheric or sub-atmospheric pressure, is terminated. The reaction time is adjusted in that a part of the pressure pipe 37 is disposed in the form of a heating coil in the uppermost reaction zone of the tower reactor 35. The double jacket 46 ensures that the reaction mass cooled by pressure reduction is returned again to reaction temperature.

The pressure-reduced reaction mass is now conducted through a falling-film cascade 42 which comprises at least 2, preferably 4 to 5, reactor trays fitted with heating coils into which the product flows centrally and submerged below the surface. The reaction gas, in contrast, is conducted separately from the tray situated respectively thereabove by means of likewise submerged pipes through the reaction mass. As a result, a differential pressure is produced which acts preferably as a pressure reduction from tray to tray from top to bottom. The product of the second to $x^{th}$ tray runs respectively on the outer wall, which acts as additional evaporation surface, of each tray into a conically shaped collector, the outflow of which is located centrally at the deepest point of the cone. In the collector there are located also the dip pipes which introduce the reaction gas into the next tray. The trays are designed preferably for a dwell time of 5 to 10 min in order to achieve the desired reaction progress. In order to control the reaction temperature preferably to a gentle increase by 2 to 10% per tray, each tray is equipped with heating coils.

It emerges from the arrangement that the reaction gas is guided in parallel flow with the product flow, the gas bubbling through the reaction mass and ensuring optimum mixing there on the one hand, and on the other hand not achieving its saturation limit because of its pressure drop with simultaneous temperature increase and consequently remaining able to absorb newly forming reaction gas (carrier effect). A further important effect of the described falling-film cascade 42 is that the low-boiling, short-chain oligomers of the product, which are still initially present, are guided back into the reaction mass with the reaction gas and take part there further in the reaction. Furthermore, by introducing the gas into the reaction mixture, by additional surface formation and contact with the gaseous diol, the bubble formation promotes the speed of the reaction.

This is not provided for example with agitated cascades and hence reduces the yield and causes disturbances in the subsequent condensers and vacuum devices.

If it is necessary to mix in additional additives or diol, a diagonally positioned agitator can be disposed in the last tray, said agitator assisting thorough mixing of the vapour bubbles.

Subsequently, by means of a suitable supply pipe the reaction mass is brought, for renewed pressure reduction, into an arrangement which has a hydrocyclone-like configuration and is equipped like the previous trays with heating coils for temperature tracking. This part of the tower reactor 35 is termed falling-film zone 43. The gas/liquid separation is effected on the surface, it being ensured by suitable baffles that the reaction mass discharges uniformly over the indented outer edge of the tray, unaffected by forming reaction gas bubbles. The reaction mass discharging at the periphery is collected on a pipe sheet—likewise on the periphery thereof—and is distributed with the assistance of so-called "lanes" uniformly on the base.

The pipe sheet is part of the straight pipe bundle which serves at the same time for film formation on the inner pipe surfaces and for heat exchange. An inflow cylinder (44) is assigned to each pipe in the bundle. The latter is configured with a series of non-axial, overlapping slots with a particularly aligned geometry at the periphery thereof. The geometry is established such that

- a minimum level is maintained for all pipes for uniform liquid distribution,
- only small level differences occur for a specific viscosity spectrum,
- changes in throughput effect a proportional level change and the inner pipe surface is wetted uniformly over the entire pipe length,
- the upper edge of the inflow cylinder 43 serves as emergency overflow and is equipped with an indented crown.

The pipe diameter is chosen such that it is greater than the largest possible arising reaction gas bubble. According to the invention, the pipes are now filled with a structured packing, filling materials, coils or expanded metal so that a slightly increased reaction time arises and contributes to increasing the molecular weight (see FIG. 3b). The reaction vapour is guided in parallel flow with the downward-running product film. The ratio of pipe length to pipe diameter is intended to be between 10 and 30 and the surface of the falling-film pipes must be adapted to the wettability of the product. The product emerges as a film and/or strands on the underside of the falling-film pipes, is combined through conical collector plates which allow the gas flow to pass through and is supplied to a second falling-film reaction zone at the periphery. This is configured in principle the same as the first zone but takes into account the increased viscosities by means of corresponding measures at the inflow cylinders 44, distribution of the pipes and length of the module.

Below the module, a device is located for combining the melt which contains, in the centre, a central pipe for leading through the reaction gases and the product. The product discharging at the device preferably at the wall is separated from the gas flow by a spoiler device 45, which gas flow is diverted and discharged in the gas chamber of the integrated prepolymer collector. The collected prepolymer is discharged from the collector after a resting and subsequent reaction time of 5 to 15 minutes via a central pipe and now can be subjected to a further treatment, e.g. granulation with subsequent solid phase postcondensation or a melt phase postcondensation. For specific products, the possibility is provided of guiding back a partial flow of the prepolymer into the lower falling-film module and mixing it with the preproduct from the upper falling-film module so that the reaction time can be increased advantageously in a simple manner.

The outer casing of the reactor is equipped with a heating jacket 46 which is provided preferably with a synthetic heat carrier vapour for the heating as active insulation. The temperature profile required for the reaction is produced with the help of the inner heating surfaces in zones essentially with a liquid heat carrier oil. The reaction gases from the different zones are discharged by normal devices such as condensers, columns and vacuum systems, the diol being guided back essentially into the process with small oligomer proportions.

FIG. 4 shows an embodiment of a reactor device 25 according to the invention in longitudinal section. The reactor device 25 comprises a reactor housing 1 which has a heated double jacket 2. The reactor housing is provided, on the inlet side, with a cover with a heating jacket 3 and, on the outlet side, with an end cover 5 with a welded lip. A rotating basket rotor is mounted horizontally thereby in the reactor 25 via mounting devices and vacuum sealing modules 4 by means of stub shaft arrangements which extend beyond the end walls of the reactor housing 1 which form the covers 3, 5. In the embodiment according to FIG. 4, the horizontally mounted rotating rotor is thereby formed by a perforated agitated basket frame 6 and a closed heated agitated basket frame 7, the transition from the perforated to the unperforated basket frame being configured as a long cone 22. The advantage of the configuration of the rotor according to the invention in the form of a heated portion as a closed frame 7 and of the unheated portion as a perforated basket frame 6 now resides in the fact that a simple operation is possible even of high-viscous polymer products and high molecular weights being able to be achieved at the same time for the polymers to be produced, e.g. polyesters. Due to the transition from the perforated to the unperforated basket frame in the form of a long cone 22, the transition from the medium-viscous sump to the high-viscous, almost sump-free operation is assisted.

The heating of the closed agitated basket frame 7 is produced, according to the embodiment according to FIG. 4, by a double jacket 23.

The annular film-forming elements 8 which are mounted on the rotatable rotor 6, 7 are formed by a tubular crown 28 and a net-like metallic structure 12 which is clamped between the tubular crown 28 and the rotor surface. The exact configuration of the annular film-forming elements 8 is shown in FIG. 5.

A further characteristic of the reactor device 25 according to the invention now resides in the fact that strippers, conveyer strippers and/or counter-strippers 11, 13, 14, 15 are disposed between each pair of annular film-forming elements. In the case of the example of the embodiment according to FIG. 4, in the region of the unheated portion 6, i.e. in the region of the perforated agitated basket frame which is defined essentially by the low-viscous region, blade strippers 11 are provided. In the region of the heated portion which is defined essentially by a high-viscous region, conveyer strippers 13 with a triangular profile and/or support wing profile and counter-strippers 14 which likewise have a triangular profile are provided. Due to this specific configuration of the different arrangement and configuration of the strippers, conveyer strippers and/or counter-strippers 11, 13, 14, 15, an almost optimum film formation and hence also an optimum operation is achieved. In order further to assist an optimum film formation, it is likewise also provided in the embodiment of the reactor device 25 according to FIG. 1 that a shaft stub stripper 18 is provided at the inlet side and resilient strippers 21 at the outlet side. In the case of the reactor device 25 according to the invention, it must be stressed in addition that, due to the arrangement of the annular film-forming elements 8 up to the end cover 5, an optimum degassing can be achieved. Hence polymer end products can be produced which have low contents of undesired by-products and also in particular low acetaldehyde contents in the case of polyesters. The discharge of the produced gases is effected in the reactor device 25 via at least one vapour connection piece 17, but preferably, as shown in FIG. 4, via two vapour connection pieces 17. As a further characteristic of the reactor device 25 according to the invention, it must be mentioned that the discharge pump 19 is integrated directly in the reactor housing 1. The polymer outlet connection piece assigned to the discharge pump 19 is thereby preferably a rectangular block flange which is integrated directly in the heating jacket 2, this being effected not as normally perpendicular to the central axis of the container but displaced parallel in the direction of rotation of the basket (see also FIG. 5). As a result, as complete as possible suctioning away of the product is achieved since the latter accumulates respectively always in the direction of rotation of the basket. For further assistance, in the reactor device according to the invention, an end cover displacer 16 is also provided in addition on the end cover so that optimum supply of the high-viscous polymer into the discharge pump 19 can be effected. In FIG. 1, the drive transmission or the motor for the horizontal basket disposed in the housing 2 is thereby designated with 20.

In FIG. 5, a cross-section of the reactor 25 described in FIG. 4 is now shown. The parallel displacement in particular, in the direction of rotation, of the discharge pump 19 emerges from FIG. 5 and the integration of a rectangular block flange 26 in the housing 1. Furthermore, the arrangement of the conveyer strippers 13 and also counter-strippers 14 respectively with a triangular profile emerges from FIG. 5. The conveyer strippers in the counter-flow are designated with 15. FIG. 5 likewise shows, in sections, the arrangement of the annular film-forming element 8 on the closed heated agitated basket frame 7. The annular film-forming element 8 thereby comprises a tubular crown 28 and also pipe rings with pipe involutes and lozenges 12. The vapour or vacuum pipe is represented again with 17 as in FIG. 4, the reference number 16 designates the end cover displacer.

The precise construction of the annular film-forming elements 8 is now shown in FIG. 6. In FIG. 6, the film-forming element 8 is thereby represented in section without the rotor. The annular film-forming element 8 thereby comprises a tubular crown 28 and also pipe rings with pipe involutes and lozenges 12. It has been shown that in particular round cross-sections, such as pipes, for the support construction assist the take-up of polymer and the striation- and film-formation, the pipe construction, as can be detected in FIG. 6, making available triangular or lozenge-shaped openings in which the drawing for the film formation takes place. The openings can hereby be disposed on tubular involutes which produce the connection to the basket frame and ensure that an enlargement of the film surface is always effected due to the rotational movement of the basket. This arrangement also has the advantage that gentle shearing (drawing cut) takes place at the strippers, as a result of which the energy feed is significantly reduced. From FIG. 6, also the corresponding dimensions of the pipes and of the involutes and triangular cut-outs are shown in addition. The dimensions of the involutes or lozenges is chosen as a function of the polymer to be produced and the viscosity thereof. In the case of high-viscous polymers, a corresponding enlargement is chosen, whereas the dimensions shown in FIG. 6 are favourable with low-viscous products.

FIG. 7 now shows again in enlarged representation a cut-out from the end cover construction 5 of the reactor device 25 according to the invention according to FIG. 1. As emerges from FIG. 7, the embodiment according to FIG. 1 has a resilient stripper 21 which is mounted with the heated jacket 23 of the closed basket frame 7 for example via screws, in addition also a spot weld 30 can be present. The resilient stripper 21 which is configured in the form of a blade ensures that contamination of the end cover with product is prevented. In addition, it is also provided that the space delimited by the resilient stripper 21 and by the end cover 5 can be purged by means of inert gas.

The invention claimed is:

1. A method for the continuous production of high-molecular polyesters by at least one of esterification of dicarboxylic acids and transesterification of dicarboxylic acid esters with diols in the presence of catalysts with formation of a prepolymer in a tower reactor for the production of a prepolymer and a prepolymerization reactor which forms an end reactor, the tower reactor configured in the lower third in the form of a hydrocyclone with a suspended heat exchanger and having a supply line for at least one of a paste, a slurry and a liquid raw material mixture, a static reaction mixer below the heat exchanger, a pressure line for coupling the hydrocyclone to the top side of the tower reactor, the top side of the tower reactor configured in its upper third in the form of a falling-film cascade, a line coupling the cascade to the middle part of the tower reactor, the cascade being configured in the form of one of a single step falling-film zone with prepressure reduction and a multi-step falling-film zone with prepressure reduction, the falling-film zones comprising falling-film pipes which have a filling comprising at least one of structured packing, filling materials, expanded metals and conducting spirals, the end reactor including a reactor housing including inner surfaces, end walls and a mounting device, a rotor which rotates in the reactor housing, the reactor having an inlet and outlet, the reactor including stub shaft arrangements extending beyond the end walls for mounting the reactor horizontally via the mounting device, annular film-forming elements disposed on the rotor, strippers disposed between the annular film-forming elements on the inner surfaces of the reactor housing, the cylindrical rotor having a heatable portion, and polycondensation thereof to form a high-molecular polyester in the polycondensation reactor comprising producing a prepolymer with >40 to 70 repeat units (DP) in the tower reactor and polycondensing this prepolymer in only the end reactor to form a polyester with >150 to 205 DP.

2. The method according to claim 1 wherein producing a prepolymer with >40 to 70 DP comprises producing a prepolymer with 45 to 65 DP.

3. The method according to claim 1 wherein producing a prepolymer with >40 to 70 DP comprises producing a prepolymer having a di-diol content of about 0.6% by weight to about 0.9% by weight.

4. The method according to claim 1 wherein producing a prepolymer with >40 to 70 DP comprises producing a prepolymer having about 20 to about 40 meq/kg COOH end groups and about 60 to about 120 meq/kg OH end groups.

5. The method according to claim 1 wherein producing a prepolymer with >40 to 70 DP comprises producing a prepolymer having a low-boiling fraction <10 ppm.

6. The method according to claim 1 wherein prepolymerization takes place in the tower reactor at temperatures in the range of about 5° C. to about 20° C. above the melting point of intermediate products.

7. The method according to claim 1 wherein a total reaction time of at most 3 hours is maintained up to and including the prepolycondensation.

8. The method according to claim 1 wherein formation of a prepolymer in a tower reactor comprises formation of a prepolymer in a tower reactor, the falling-film pipes of which have a filling comprising at least one of structured packing, filling materials, expanded metal and conducting spirals.

9. The method according to claim 1 wherein polycondensing the prepolymer in only one further reactor to form a polyester with >150 to 205 DP comprises polycondensing the prepolymer in only one further reactor to form a polyester with >150 to 180 DP.

10. The method according to claim 1 wherein polycondensing the prepolymer in only one further reactor to form a polyester with >150 to 205 DP comprises polycondensing the prepolymer in an end reactor which has a horizontally rotating basket rotor in a reactor housing with an inlet and outlet, the rotor having at least one portion which is at least one of partially heated and partially cooled.

11. The method according to claim 10 wherein polycondensing the prepolymer in only one further reactor to form a polyester with >150 to 205 DP comprises polycondensing the prepolymer in a reactor in which transporting strippers transport the melt to surface forming pipe rings.

12. The method according to claim 1 wherein polycondensing the prepolymer in only one further reactor to form a polyester with >150 to 205 DP comprises treating the melt in a discharge region of the polycondensation at a temperature which is in the range of about 5° C. to about 20° C. above the melting point of the melt in a gas chamber at reduced pressure.

13. The method according to claim 12 further comprising discharging the melt from the polycondensation via a melt line and granulating the discharged melt for a period in the range of about 1 minute to about 2 minutes.

14. The method according to claim 13 wherein granulating the discharged melt comprises hot cutting the discharged melt, the method further comprising treating the granulate while maintaining the temperature of the granulate required for the crystallisation and drying and degassing the granulate by diffusion in the presence of a carrier gas at a temperature between about 150° C. and about 180° C.

15. The method according to claim 14 wherein discharging the melt from the polycondensation via a melt line, granulating the discharged melt, treating the granulate while maintaining the temperature of the granulate required for the crystallisation and drying and degassing the granulate by diffusion in the presence of a carrier gas together comprise producing a granulate particle which has a proportion of <1 ppm of diffusible low-boiling components, a crystal proportion of about 30% to about 45% and a crystallite form which corresponds to the treatment temperature and a configuration value of the Gaussian and trans-structures in the Gaussian distribution, but with the outer spherical casing having an increased trans-structure.

16. The method according to claim 1 wherein at least one of esterification of dicarboxylic acids and transesterification of dicarboxylic acid esters with diols comprises at least one of esterification of dicarboxylic acids and transesterification of dicarboxylic acid esters with 1-ethane diol.

17. The method according to claim 1 wherein at least one of esterification of dicarboxylic acids and transesterification of dicarboxylic acid esters with diols comprises at least one of esterification of terephthalic acid and transesterification of terephthalic acid esters with diols.

18. The method according to claim 1 wherein at least one of esterification of dicarboxylic acids and transesterification of dicarboxylic acid esters with diols comprises at least one of esterification of dicarboxylic acids and transesterification of dimethylterephthalate (DMT) with diols.

19. The method according to claim 1, wherein at least one of esterification of dicarboxylic acids and transesterification of dicarboxylic acid esters with diols in the presence of catalysts comprises at least one of esterification of dicarboxylic acids and transesterifivation of dicarboxylic acid esters in the presence of at least one of: antimony; an antimony-containing organic compound; a porous antimony-containing carrier substance; antimony nanoparticles; germanium; a germanium-containing organic compound;

a porous germanium-containing carrier substance; germanium nanoparticles; tin; a tin-containing organic compound; a porous tin-containing carrier substance; tin nanoparticles;

titanium; a titanium-containing organic compound; a porous titanium-containing carrier substance; and, titanium nanoparticles.

* * * * *